United States Patent [19]

Liehr

[11] Patent Number: 4,807,796

[45] Date of Patent: Feb. 28, 1989

[54] METHOD OF SOLDERING ALUMINUM-OXIDE CERAMIC COMPONENTS

[75] Inventor: Manfred R. Liehr, Hamburg, Fed. Rep. of Germany

[73] Assignee: U.S. Philips Corporation, New York, N.Y.

[21] Appl. No.: 119,008

[22] Filed: Nov. 10, 1987

[30] Foreign Application Priority Data

Nov. 14, 1986 [DE] Fed. Rep. of Germany ....... 3639021

[51] Int. Cl.$^4$ ............................................. B23K 31/02
[52] U.S. Cl. ..................................... 228/121; 228/219
[58] Field of Search ............ 228/121, 122, 123, 173.1, 228/188, 219, 220

[56] References Cited

U.S. PATENT DOCUMENTS

| | | | |
|---|---|---|---|
| 3,616,524 | 11/1971 | Wilhelmus | 228/220 |
| 3,766,634 | 10/1973 | Babcock et al. | 228/188 |
| 3,911,553 | 10/1975 | Burgess et al. | 228/173.1 |
| 3,923,551 | 12/1975 | Purdy | 228/122 |
| 3,994,430 | 11/1976 | Cusano et al. | 228/122 |
| 4,505,418 | 3/1985 | Neidig et al. | 228/219 |
| 4,576,659 | 3/1986 | Lewis et al. | 228/123 |
| 4,623,086 | 11/1986 | Tihanyi et al. | 228/220 |

FOREIGN PATENT DOCUMENTS 5181770 10/1983 Japan .................................. 228/220

*Primary Examiner*—M. Jordan
*Attorney, Agent, or Firm*—Norman N. Spain

[57] ABSTRACT

In a method of dust-free and vacuum-tight interconnecting of ceramic aluminum-oxide components in a protective gas atmosphere the components are interconnected by heating and the use of a solder. Soldering the components is effected in a protective gas consisting of a mixture of air and nitrogen. A copper/silver solder from which individual constituents diffuse into the surfaces of the components during the soldering procedure is used as the soldering material.

5 Claims, No Drawings

METHOD OF SOLDERING ALUMINUM-OXIDE CERAMIC COMPONENTS

BACKGROUND OF THE INVENTION

The invention relates to a method of dust-free and vacuum-tight interconnecting ceramic aluminum-oxide components in a protective gas atmosphere, using a solder material which connects the components by heating.

In a first known method of connecting ceramic components the ceramic is metal-plated before the soldering operation to obtain an appropriate wetting ratio of the solder during soldering. For that purpose in a known method, commonly referred to as a Mo-Mn method, molybdenum particles (Mo) and a residual quantity of manganese (Mn) and silicon dioxide ($SiO_2$) are, for example, fused into the ceramic in a moist, protective gas atmosphere ($H_2/N_2$). The resultant manganese oxides combine with the aluminum oxide ceramic ($Al_2O_3$) while forming a mixed oxide. The vitrifying silicon dioxide improves the embedding and the adhesion of the molybdenum particles. The molybdenum particles, which optionally are additionally provided with a dull nickel layer and project from this cover coat, applied bymetal plating, enable bonding to the metal solder. In a similar method, disclosed in the German Patent DE No. 700,840, a metal is sintered onto the ceramic before soldering. The soldering operation is effected subsequent thereto in a weakly reducing atmosphere.

In a further known method of soldering ceramic aluminum-oxide components, metal-plating of the ceramic surface to be soldered is not required. In this method what is commonly referred to as an activated solder is used during the soldering operation. In addition to the basic solder, activated soldering materials additionally include alloying, highly reactive metals, for example titanium (Ti) or zirconium (Zr). These alloying metals are referred to as active components and have a particularly high affinity to oxygen. These properties are used to partly draw the oxygen from the aluminum oxide ceramic, to produce oxides of these metals. The oxide of the titanium or of the zirconium thus obtained can be dissolved in the ceramic oxides while forming a mixed oxide. These oxides diffuse into the surface of the ceramic, taking the basic soldering material along, and thus produce a proper connection. The connection or wetting, respectively, occur however only in those places which are in direct contact with the solder. This implies that no flow into possibly existing capillary joints occurs.

These known methods of soldering ceramic aluminum-oxide components have however some disadvantages. In the first method, in which the ceramic is metal-plated to ensure an a adequate adhesion and wetting of the soldering material to the ceramic, the metal-plating operation requires up to six process steps which render the method very complicated and consequently not very economical. The second method requires activated soldering materials, only very few of which are commercially available. In addition, these activated soldering materials are very expensive because of the admixture of metals which are highly reactive with oxygen. Moreover, this solder is not capable of completely filling the joint between the parts to be connected, as the active component only acts in that region where the soldering material was deposited before heating.

Swiss Patent CH No. 328,016 discloses a method of interconnecting ceramic objects or for joining two metal objects, in which a special paste is used consisting of a mixture of silver oxide and copper oxide. The paste is applied to the ceramic materials before soldering. The ratio of mix of the two oxides in the paste determines during the ultimate soldering operation the quality of the wetting of the ceramic and the adhesive power of the soldered joint. The specific disadvantage of this method is that it requires the production of a special paste. In producing this paste it is necessary for the ratio of mix of the two oxides in the paste to be adjusted accurately, because of which the production offers some problems.

SUMMARY OF THE INVENTION

The invention has for its object to provide a method of a dust-free and vacuum-tight connection of ceramic aluminum-oxide modules to each other, which results in a fail-safe interconnection of the ceramic modules which does not have a tendency to embrittlement and subsequent fracture, and which is commercially feasible.

According to the invention, this object is accomplished in that soldering of the aluminum oxide is effected in a protective gas consisting of a mixture of air and nitrogen, that a copper/silver solder is used as the soldering material, individual constituents of which, including copper oxide formed during soldering, diffuse into the surfaces of the components during the soldering procedure, and that the degree of oxidation of the copper during soldering is set by adjusting the air-to-nitrogen ratio in the protective gas.

In this method a solder is used consisting of copper and silver, which is utilized for soldering the ceramic components in a protective gas composed of a mixture of air and nitrogen. Compared with the prior art methods, this method has, inter alia, the advantage that no activated component parts must be alloyed into the solder and that the solder is capable of filling the capillary joint during the soldering procedure. Commercially available copper/silver can be used. The appropriate adhesion of the solder to the ceramic material is achieved since during soldering the copper contained in the solder oxidizes to form copper oxide and this copper oxide diffuses into the aluminum oxide ceramic. As the silver is only able to form a solid phase with the copper, silver will scarcely be present in this zone of diffused copper oxide. As a result the silver is present between the two copper oxide layers and thus acts as a solder upon the plating with copper oxide of the aluminum oxide surface, which automatically occurs during the soldering process.

In this method both metal-plating of the ceramic components before the soldering procedure and also the use of more expensive, activated solders are superfluous.

DETAILED DESCRIPTION OF THE INVENTION

Preference is given to conventional copper/silver solders, whose copper content, which oxidizes into copper oxide during the soldering operation, diffuses into the surfaces of the aluminum oxide ceramic and thus provides a proper connection thereto. The silver in the solder with its proper flow behaviour serves in the first place to link the aluminum oxide particles and consequently to fill the capillary joint. The copper content in the solder, whose oxidation and subsequent diffusion into the ceramic enables the appropriate solder connection, may amount to nearly 100 volume % in the solder. Some residual silver is however required for wetting purposes or for soldering.

The ratio of mix between air and nitrogen in the protective gas in which soldering of the components is effected, determines how much copper oxide can be produced during the soldering operation. In this manner it is then easy to set essential parameters of the soldering operation, such as, for example, the quality of wetting of the surfaces and the adhesive power of the soldered joint, by adjusting the ratio of mix between air and nitrogen and the protective gas. In this way it is also possible to provide a simple adaptation to different materials or to charge marginal conditions during soldering. Soldering paste containing predetermined materials in accurately defined ratios of mix, for a control of the copper oxide content, is not required.

This method of soldering aluminum-oxide ceramic components consequently combines important advantages as compared to the prior art methods. Pre-processing of the ceramic components, for example metal-plating, is not required anymore. The soldering materials used are conventional, commercially available solders, which are relatively cheap, as no metals which are highly reactive to oxygen must be alloyed therein, and they fill any capillary joints, without the need of placing them manually in the capillary joint before the start of this soldering operation.

In accordance with a further embodiment of the invention it is provided that the protective gas mixture is composed of approximately 54 Vol. % of nitrogen and 46 Vol. % of air. This composition of the protective gas mixture has proved to be particularly advantageous, as at this air-to-nitrogen ratio of mix exactly the desired degree of oxidation of the copper occurs. Should the oxygen content in the protective gas atmosphere be too high, then an overreaction will occur during the soldering step. The solder drop produced then has a porous surface, so that the resultant soldered joint is not sutable for use because of cracks and the formation of coarse grains. Should the oxygen content in the protective gas atmosphere be too low, the formation of oxide is not sufficient to ensure adhesion to the ceramic.

In a further embodiment of the invention a eutectic copper/silver solder is used as the soldering material. The use of eutectic copper/silver solder has proved to be advantageous, as this solder has an appropriate flow behaviour and consequently ensures an adequate wetting of the ceramic component surfaces to be soldered and the solder also contains a sufficient quantity of copper which can oxidize into copper oxide to provide a proper adhesion to the ceramic.

In accordance with a further embodiment of the invention soldering is effected at a temperature of approximately 1120° C.

If, for example eutectic copper/silver solder is used, its liquidus point is at approximately 780° C. This temperature is however not sufficiently high for the soldering process, as the copper oxide formed does not melt at his temperature and consequently cannot diffuse into the surface of the ceramic. It has been found that a temperature of approximately 1120° C. during the soldering process is particularly advantageous. At this temperature it is ensured that a copper oxide-containing melt phase is formed, which diffuses into the ceramic.

A further embodiment of the invention provides that a copper-oxide skin deposited during soldering on the solder surface is removed by means of a reduction process, which is initiated during cooling of the solder.

As has already been mentioned in the foregoing, in the solidified solder pure silver collects above the diffusion zone, in which copper-oxide is trapped. The free surface of the solidified solder is covered by an oxide skin. This oxide skin can advantageously be removed by means of a reduction process which is initiated during cooling of the solder. This initiates the reduction of the copper oxide, by the supply of nitrogen.

What is claimed is:

1. A method of dust-free and vacuum-tight interconnecting ceramic aluminum-oxide components each to the other by soldering in a protective gas atmosphere, using a solder material which connects the components by heating, characterized in that soldering of the components is effected in a protective gas consisting of a mixture of air and nitrogen, that a copper/silver solder is used as the soldering material, individual constituents of which, including copper oxide formed during heating, diffuse into the surfaces of the ceramic components during the soldering procedure, and that the degree of oxidation of the copper during soldering is set by adjusting the air-to-nitrogen ratio in the protective gas.

2. A method as claimed in claim 1, characterized in that the protective gas mixture is composed of approximately 54 Vol. % of nitrogen and 46 Vol. % of air.

3. A method as claimed in claim 1, characterized in that a eutectic copper/silver solder is used as the soldering material.

4. A method as claimed in claim 1, characterized in that soldering is effected at a temperature of approximately 1120° C.

5. A method as claimed in claim 1, characterized in that a copper oxide skin deposited during soldering on the surface of the solder is removed by means of a reduction process, which is initiated during cooling of the solder step.

* * * * *